United States Patent
Popescu et al.

(10) Patent No.: US 11,334,721 B2
(45) Date of Patent: *May 17, 2022

(54) SYSTEM, METHOD, AND RECORDING MEDIUM FOR CORPUS PATTERN PARAPHRASING

(71) Applicant: International Business Machines Corporation, Armonk, NY (US)

(72) Inventors: Octavian Popescu, Yorktown Heights, NY (US); Vadim Sheinin, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 27 days.

This patent is subject to a terminal disclaimer.

(21) Appl. No.: 16/528,434

(22) Filed: Jul. 31, 2019

(65) Prior Publication Data

US 2019/0354590 A1 Nov. 21, 2019

Related U.S. Application Data

(63) Continuation of application No. 15/087,023, filed on Mar. 31, 2016, now Pat. No. 10,380,258.

(51) Int. Cl.
| | |
|---|---|
| *G06F 40/30* | (2020.01) |
| *G06F 40/211* | (2020.01) |
| *G06F 40/247* | (2020.01) |
| *G06F 40/284* | (2020.01) |
| *G06F 40/40* | (2020.01) |
| *G06F 40/44* | (2020.01) |
| *G06F 40/45* | (2020.01) |

(Continued)

(52) U.S. Cl.
CPC ............ *G06F 40/30* (2020.01); *G06F 40/211* (2020.01); *G06F 40/247* (2020.01); *G06F 40/284* (2020.01); *G06F 40/205* (2020.01); *G06F 40/237* (2020.01); *G06F 40/289* (2020.01); *G06F 40/40* (2020.01); *G06F 40/44* (2020.01); *G06F 40/45* (2020.01); *G10L 15/1822* (2013.01)

(58) Field of Classification Search
None
See application file for complete search history.

(56) References Cited

U.S. PATENT DOCUMENTS

| | | | |
|---|---|---|---|
| 6,405,162 B1 | 6/2002 | Segond et al. | |
| 7,085,708 B2 * | 8/2006 | Manson | G06F 40/40 704/9 |

(Continued)

OTHER PUBLICATIONS

Hanzliccaron EK, Z.; "Classification of Prododic Phrases by Using HMMs"; Text, Speechand Dialogue.18th International Conference, TSD Proceedings:LNCS 9302, pp. 497-505, 2015.‡

(Continued)

*Primary Examiner* — Richard Z Zhu
(74) *Attorney, Agent, or Firm* — Peter Edwards, Esq.; McGinn I.P. Law Group, PLLC.

(57) ABSTRACT

A corpus pattern paraphrasing method, system, and non-transitory computer readable medium, include aligning slots of patterns for verbal phrases based on syntactical and lexical features along with calculated synonyms to predict paraphrases that are not previously stored in a corpus of sentences in a database.

14 Claims, 5 Drawing Sheets

(51) Int. Cl.
G06F 40/205 (2020.01)
G06F 40/237 (2020.01)
G06F 40/289 (2020.01)
G10L 15/18 (2013.01)

(56) References Cited

U.S. PATENT DOCUMENTS

| | | | | |
|---|---|---|---|---|
| 7,546,235 | B2* | 6/2009 | Brockett | G06F 40/45 |
| | | | | 704/9 |
| 7,552,046 | B2* | 6/2009 | Brockett | G06F 40/20 |
| | | | | 704/9 |
| 7,584,092 | B2* | 9/2009 | Brockett | G06F 40/20 |
| | | | | 704/9 |
| 7,937,265 | B1* | 5/2011 | Pasca | G06F 40/247 |
| | | | | 704/9 |
| 7,957,968 | B2 | 6/2011 | Gupta et al. | |
| 8,316,007 | B2 | 11/2012 | Liao | |
| 8,977,537 | B2 | 3/2015 | Burges et al. | |
| 9,037,464 | B1* | 5/2015 | Mikolov | G06F 40/30 |
| | | | | 704/255 |
| 9,606,980 | B2* | 3/2017 | Andrejko | G06F 40/56 |
| 2002/0099730 | A1 | 7/2002 | Brown et al. | |
| 2004/0181390 | A1* | 9/2004 | Manson | G06F 40/55 |
| | | | | 704/2 |
| 2005/0033568 | A1 | 2/2005 | Yu et al. | |
| 2005/0137855 | A1* | 6/2005 | Maxwell, III | G06F 40/56 |
| | | | | 704/9 |
| 2007/0011154 | A1 | 1/2007 | Musgrove et al. | |
| 2009/0119090 | A1* | 5/2009 | Niu | G06F 40/44 |
| | | | | 704/1 |
| 2010/0198592 | A1* | 8/2010 | Potter | G10L 15/20 |
| | | | | 704/233 |
| 2013/0103390 | A1* | 4/2013 | Fujita | G06F 40/279 |
| | | | | 704/9 |
| 2013/0110493 | A1‡ | 5/2013 | Kim | G06F 40/45 |
| | | | | 704/2 |
| 2013/0138665 | A1 | 5/2013 | Hu et al. | |
| 2014/0039870 | A1* | 2/2014 | Roy | G06F 40/51 |
| | | | | 704/2 |
| 2016/0179945 | A1* | 6/2016 | Lastra Diaz | G06F 16/3334 |
| | | | | 707/739 |
| 2017/0017635 | A1 | 1/2017 | Leliwa et al. | |

OTHER PUBLICATIONS

Anonymously; Method to extract simple and compound terms from text corpuses (without performing full semantic analysis); http://ip.com/IPCOM/000220204D; Jul. 25, 2012.‡

IBM; "Apparatus and Method for Technical Advantage IndicatorExtraction";http://ip.com/IPCOM/0001 83487D; May 25, 2009.‡

United States Notice of Allowance dated Apr. 1, 2019, in U.S. Appl. No. 15/087,023.

United States Office Action dated Dec. 10, 2018, in U.S. Appl. No. 15/087,023.

United States Office Action dated Aug. 23, 2018, in U.S. Appl. No. 15/087,023.

United States Office Action dated Feb. 22, 2018, in U.S. Appl. No. 15/087,023.

United States Office Action dated Nov. 9, 2017, in U.S. Appl. No. 15/087,023.

United States Office Action dated Jul. 11, 2017, in U.S. Appl. No. 15/087,023.

Mel, et al. "The NIST Definition of Cloud Computing". Recommendations of the National Institute of Standards and Technology. Nov. 16, 2015.

\* cited by examiner
‡ imported from a related application

SYSTEM, METHOD, AND RECORDING MEDIUM FOR CORPUS PATTERN PARAPHRASING

CROSS REFERENCE TO RELATED APPLICATIONS

The present application is a Continuation Application of U.S. patent application Ser. No. 15/087,023 filed on Mar. 31, 2016, which is related to co-pending U.S. patent application Ser. No. 15/087,050, and co-pending U.S. patent application Ser. No. 15/087,032, each of which was filed on Mar. 31, 2016, the entire contents of which are incorporated herein by reference.

BACKGROUND

The present invention relates generally to a corpus pattern paraphrasing system, and more particularly, but not by way of limitation, to a system for generalizing over individual instances to obtain patterns of paraphrases without requiring data in a corpus of sentences.

Mapping verbal usage to regular expressions have been considered. Conventional techniques proved that regular expressions extracted corpora can be learned and they are instrumental to a wide range of applications involving semantic processing. Such conventional techniques involve using of ontological categories.

Other conventional techniques rely on bags of words (i.e., a fixed number of lexical features) in order to predict the meaning of input content.

In order to paraphrase sentences, conventional techniques have completely relied on the information in a stored corpus of sentences and are incapable of generating new paraphrases unless the data is stored in the corpus of sentences.

However, there is a technical problem with the conventional techniques that prediction paraphrasing cannot be done if the related paraphrased sentence is stored in the corpus of sentences which limits the prediction capabilities to that of a database.

SUMMARY

The inventors have considered the technical solution to the technical problem by aligning the slots of patterns for verbal phrases based on syntactical and lexical features along with calculated synonyms to predict paraphrases that are not previously stored in a corpus of sentences in a database.

In an exemplary embodiment, the present invention can provide a corpus pattern paraphrasing system including an analyzing circuit configured to analyze a corpus of sentences stored in a database to determine regular structures including a plurality of substitute words for verbs expressed as patterns and apply deep learning of the regular structures over the patterns, a representative word determining circuit configured to determine a plurality of representative words that represents each class of word of the regular structures, and an aligning circuit configured to align word slots of a paraphrase pattern of the classes of words replaced with substitute words and representative words in the paraphrase pattern to give a same semantic meaning to the paraphrase pattern as a sentence of the corpus of sentences.

Further, in another exemplary embodiment, the present invention can provide a corpus pattern paraphrasing method including analyzing a corpus of sentences stored in a database to determine regular structures including a plurality of substitute words for verbs expressed as patterns and apply deep learning of the regular structures over the patterns, determining a plurality of representative words that represents each class of word of the regular structures, and aligning word slots of a paraphrase pattern of the classes of words replaced with substitute words and representative words in the paraphrase pattern to give a same semantic meaning to the paraphrase pattern as a sentence of the corpus of sentences.

Even further, in another exemplary embodiment, the present invention can provide a non-transitory computer-readable recording medium recording a corpus pattern paraphrasing program, the program causing a computer to perform: analyzing a corpus of sentences stored in a database to determine regular structures including a plurality of substitute words for verbs expressed as patterns and apply deep learning of the regular structures over the patterns, determining a plurality of representative words that represents each class of word of the regular structures, and aligning word slots of a paraphrase pattern of the classes of words replaced with substitute words and representative words in the paraphrase pattern to give a same semantic meaning to the paraphrase pattern as a sentence of the corpus of sentences.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
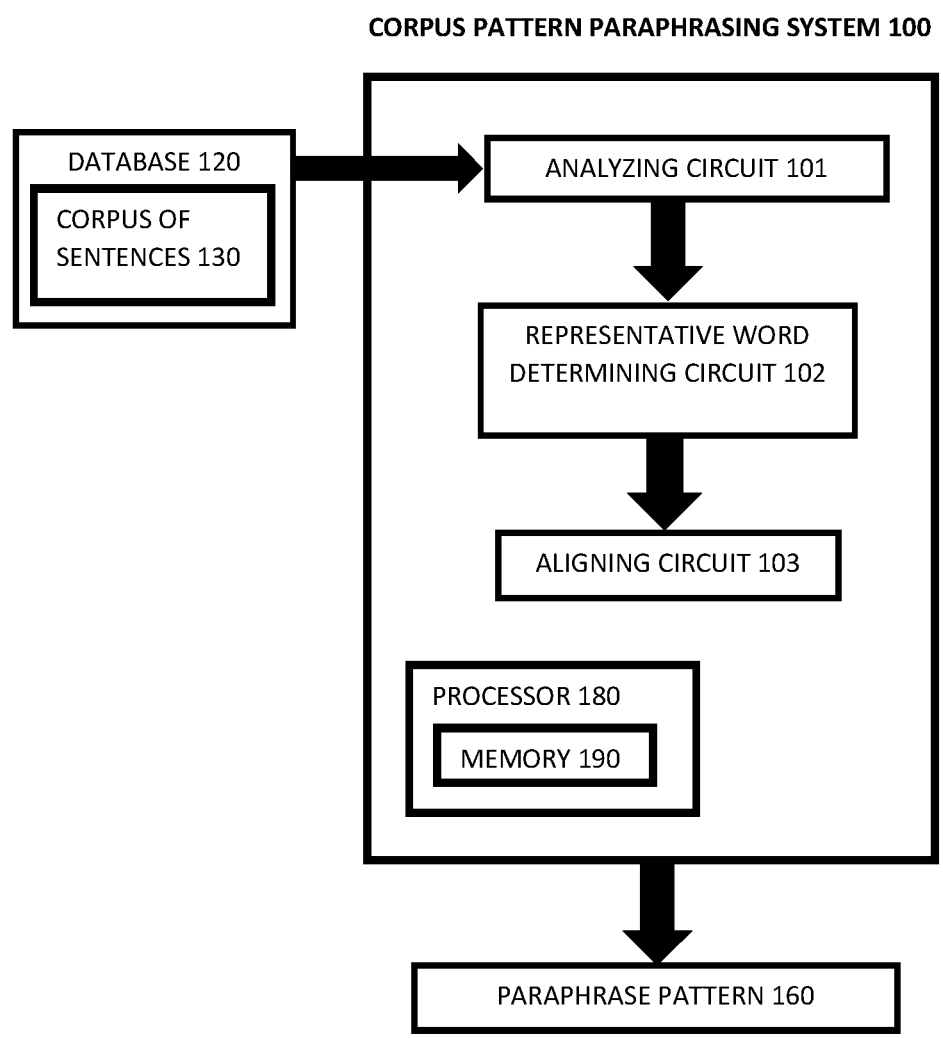
FIG. 1 exemplarily shows a block diagram illustrating a configuration of a corpus pattern paraphrasing system 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the corpus pattern paraphrasing system 100 includes an analyzing circuit 101, a representative word determining circuit 102, and an aligning circuit 103. The corpus pattern paraphrasing system 100 includes a processor 180 and a memory 190, with the memory 190 storing instructions to cause the processor 180 to execute each circuit of corpus pattern paraphrasing system 100. The processor and memory may be physical hardware components, or a combination of hardware and software components.

Although the corpus pattern paraphrasing system 100 includes various circuits, it should be noted that a corpus pattern paraphrasing system can include modules in which the memory 190 stores instructions to cause the processor 180 to execute each module of corpus pattern paraphrasing system 100.

Also, each circuit can be a stand-alone device, unit, module, etc. that can be interconnected to cooperatively produce a transformation to a result.

With the use of these various circuits, the corpus pattern paraphrasing system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties perception, goal-oriented behavior, learning/memory and action—that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging circuits, microphones, physiological and kinematic sensors in a high dimensional measurement space) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a cognitive state. The present application also describes the analysis, categorization, and identification of these cognitive states by means of further feature analysis of subgraphs, including dimensionality reduction of the subgraphs, for example by means of graphical analysis, which extracts topological features and categorizes the resultant subgraph and its associated feature nodes and edges within a subgraph feature space.

Figure 3:
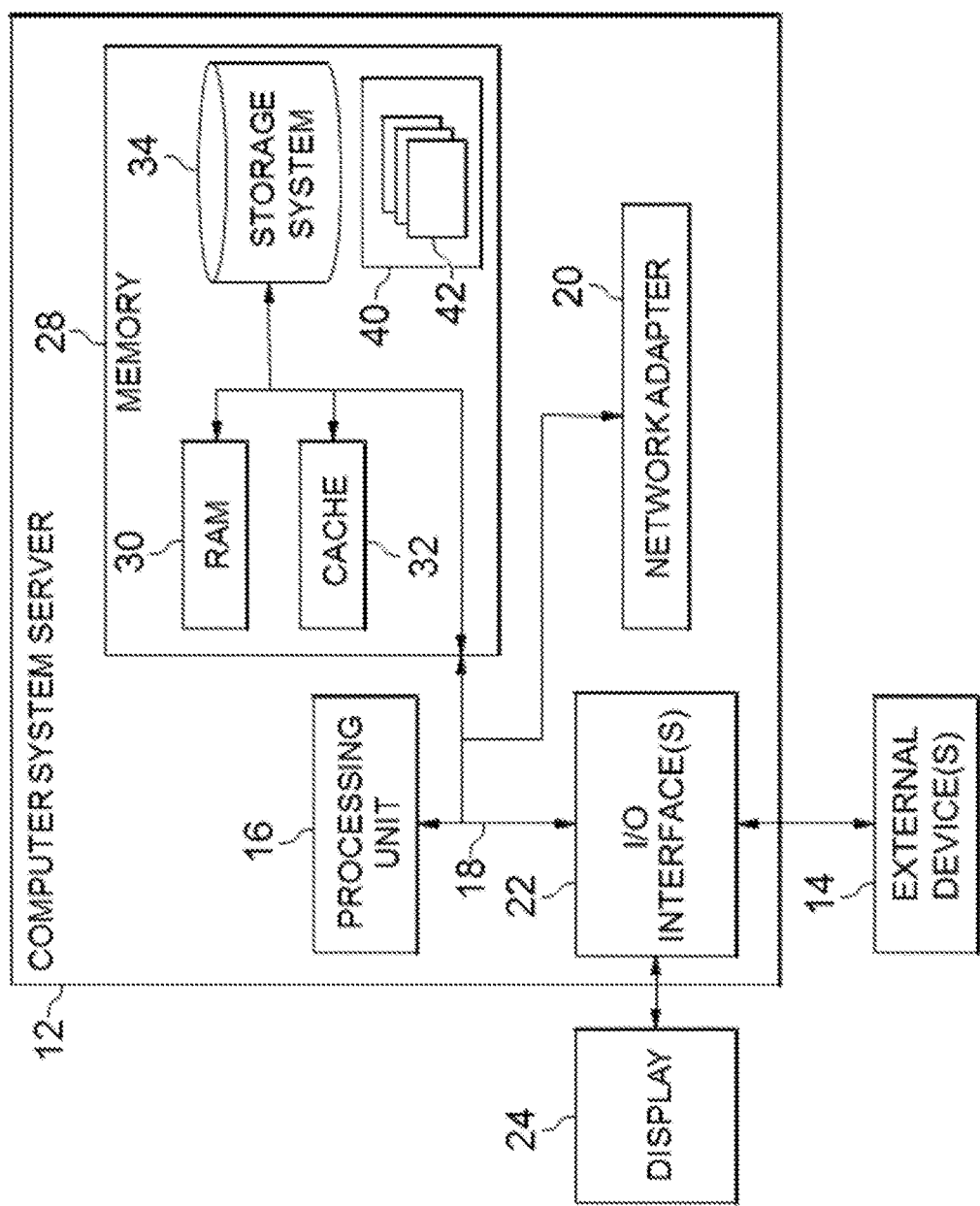
FIG. 3 depicts a cloud computing node 10 according to an embodiment of the present invention.
Figure 4:
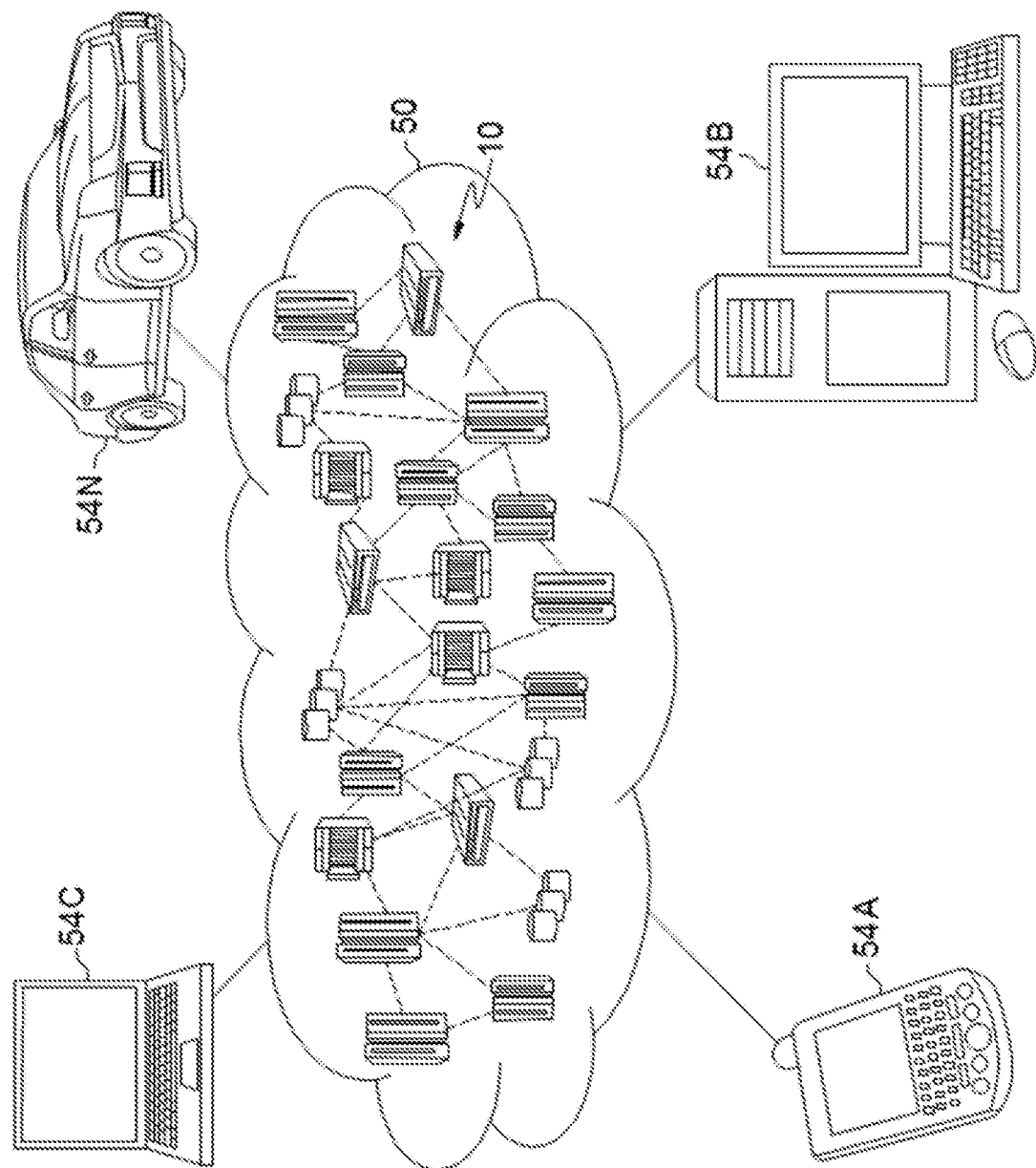
FIG. 4 depicts a cloud computing environment 50 according to another embodiment of the present invention.
Figure 5:
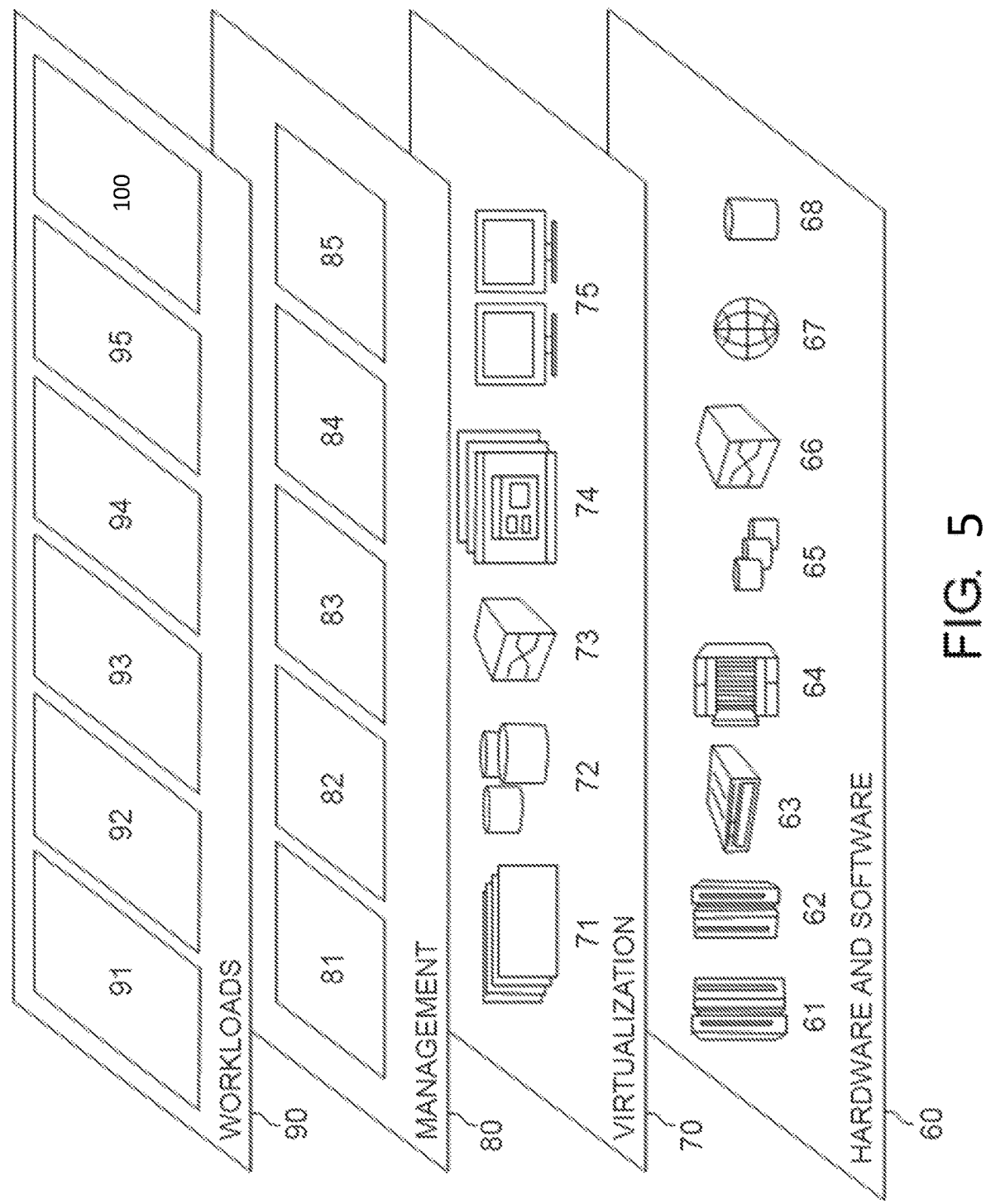
FIG. 5 depicts abstraction model layers according to an embodiment of the present invention.

Although as shown in FIGS. 3-5 and as described later, the computer system/server 12 is exemplarily shown in cloud computing node 10 as a general-purpose computing circuit which may execute in a layer the corpus pattern paraphrasing system 100 (FIG. 5), it is noted that the present invention can be implemented outside of the cloud environment.

The analyzing circuit 101 analyzes the corpus of sentences 130 stored in the database 120 to determine the regular structures expressed as patterns and apply deep learning of structure over the patterns.

In other words, the analyzing circuit 101 calculates the lexical features using known syntactical features to determine the semantical meaning of a sentence in the corpus of sentences to determine the regular structures which are expresses as a pattern and the analyzing circuit 101 applies deep learning to the structures to determine substitutes or synonyms for the words in the sentence which would result in the same semantical meaning of the sentence (i.e., same usage of a similar words such that the sentence has the same semantic meaning) in order to assist in generating syntactic slots to be aligned by the aligning circuit 103. For example, the analyzing circuit 101 will determine that "buy", "obtain", "have", "acquire", "offer", etc. can be interchanged in a sentence to give the same semantical meaning.

That is, the corpus of sentences 130 include two classes of a syntactical class and a lexical class. The syntactical classes are a given parameter. The analyzing circuit 101 identifies the lexical features around ambiguous words in the corpus of sentences 130 to give meaning to the ambiguous words. The analyzing circuit discovers the lexical features of the corpus of sentences 130. In other words, the lexical features are an unknown parameter that the analyzing circuit 101 discovers. The analyzing circuit 101 further uses the structure of the sentence found from the syntactical class that is given (i.e., subject, verb, etc.) in conjunction with the analyzed lexical features to create a regular rule such that semantical meaning for the sentence is determined.

The analyzing circuit 101 discovers the lexical features of the corpus of sentences 130 based on lattice algebra to infer automatically from the corpus of sentences 130 and the set of concepts that are required. The analyzing circuit 101 expresses the difference between different senses via the concepts and their syntactic positions. In other words, the analyzing circuit 101 determines relationships between senses of words in the corpus of sentences 130 such that it is determined what each word contributes to the entire sentence (i.e., the lexical features).

In theoretical computer science and formal language theory, a regular language (also called a rational language or a regular rule) is a formal language that can be expressed using a regular expression, in the strict sense of the latter notion used in theoretical computer science. A regular language can be defined as a language recognized by a finite automaton. The equivalence of regular expressions and finite automata is known as Kleene's theorem.

The analyzing circuit 101 further creates a plurality of regular rules based on the corpus of sentences 130 in the database 120. It is noted that a regular rule does not depend on history or on applying any other rules. That is, the regular rules can be used to predict the meaning of a user input without referring to the database 120 and independently of any other rule.

The analyzing circuit 101 further analyzes the corpus of sentences 130 stored in the database 120 to identify the internal structure of the word in the sentence, like verbal group, noun phrases, subject, etc. Thus, the analyzing circuit 101 identifies the syntactical feature of the words of the corpus of sentences 130.

Based on the identified syntactical feature of the word, a new word is created that is a combination of the syntactical feature and the word along with a key cite references which sentence of the corpus of sentences that the word was identified to be located in. For example, if the identified word by the analyzing circuit 101 is "house" and the syntactical feature of "house" is "subject", a new word "subject_house" is created. If the word house appears in another sentence or again in the same sentence and is a verb, a new word for "house" as "verb_house" is created. The analyzing circuit 101 continuously creates new words for the corpus of sentences.

Each matching new word together is clustered into a group. For example, all of the "subject_house" and "verb_house" new words are respectively clustered together including the key cite to the sentences which used the word "house". In this manner, the new words are clustered according to their syntactical usage. The clustered groups are filtered such that a partial set of each of the clustered groups of new words can be processed using word embedding to obtain vectors that encode syntactic structure and concepts by performing processing by word embedding processing on the filtered partial set of each of the clustered groups of new words. For example, the word embedding processing can be a Recurrent Neural Networks (RNN). By performing the word embedding processing on the filtered partial set of the clustered groups of new words, the vectors representing the syntactical information are much more accurate than performing RNN on a bag of words.

Using the regular rules created by the analyzing circuit 101, the analyzing circuit 101 determines the regular structures of a sentence and expresses the regular structure as a pattern. For example, if the sentence being analyzes is "I pay $700 for a laptop from manufacturer", the analyzing circuit 101 determines that "pay" has a particular meaning in the sentence to give the sentence the semantic Meaning of an individual paying for a laptop from someone. The analyzing circuit 101 using the above techniques is able to classify that the pattern of the sentence is ["X" pay "Y" for "Z" from "U"] where "X" is a client or customer ([PER]), "Y" is a monetary value ([MONEY]), "Z" is an artifact ([ARTIFACT]), "U" is an organization ([ORG]). Each of "X" "Y", "Z", and "U" are a class of words. In other words, the analyzing circuit 101 classifies the terms of the sentence and creates the pattern such that the sentence can be paraphrased using other verbs that are interchangeable with "pay".

Based on the classes of the pattern, the representative word determining circuit 102 determines a plurality of words that can represent each class such that the aligning circuit 103 can calculate a probability that the created paraphrase has a same semantic meaning using the representative words along with the interchangeable verbs. The representative words are words that can represent the classes "X", "Y", "Z", and "U". For example, the representative word determining circuit 102 finds a plurality of words that can be used in a sentence and classified as a client or customer ([PER]).

Based on the substitute or synonym words determined by the analyzing circuit 101 and using the representative words found by the representative word determining circuit 102, the aligning circuit 103 aligns the classes of words with the substitute or synonym words according to their syntactic slots to give the same semantic meaning with the different words to paraphrase the identified sentence using the different set of substitute or synonym words.

The aligning circuit 103 determines if the pattern is correctly aligned based on a probability that the words are aligned to give the same semantic meaning.

Referring back to the above example of ["X" pay "Y" for "Z" from "U"], the analyzing circuit 101 identifies that "has" is a synonym or substitute for the word "pay" and can result in the same semantic meaning. The aligning circuit 103 aligns the classes of words and the verbs with the synonym or substitute word in each possible combination and calculates the probability that the same semantic meaning is given. Thus, the aligning circuit 103 will produce a plurality of paraphrase patterns such that each combination of classes and the synonym or substitute is considered such as a first pattern of "John ("X") have manufacturer ("U") for $600 ("Y") from laptop ("Z")" or a second pattern "Manufacturer ("U") has a laptop ("Z") for John ("X") at $600 ("Y")". The second pattern has a higher probability to have the same semantic meaning as ["X" pay "Y" for "Z" from "U"] than the first pattern and thus it is determined that the aligning circuit 103 has produced a correct paraphrase pattern 160. The output paraphrase pattern 160 is ["U" has "Z" for "X" at "Y"].

The aligning circuit 103 continuously produces paragraph patterns 160 for each of the substitute or synonym words so that a plurality of different paraphrase patterns 160 are output. In this manner, a user can input a different way to say a command and the system can recognize that the command has a similar semantic meaning even if completely different words are used.

Other exemplary paraphrase patterns produced by the aligning circuit 103 are ["X" buys "Z" for "Y" from "U"], ["X" obtains "Z" for "Y" from "U"], ["X" gets "Z" from "U" for "Y"], etc.

It is noted that for each paraphrase pattern 160 output by the aligning circuit 103, the aligning circuit 103 computes the probability of the paraphrase pattern 160 having a same semantic meaning for each order of the classes and syntactical words. Further, it is noted that the examples were given with a verb but paraphrase patterns 160 can be output for any syntactical part of a sentence.

The corpus pattern paraphrasing system 100 includes the analyzing circuit 101, the representative word determining circuit 102, and the aligning circuit 103 to cooperatively execute the follow pseudo algorithm based on input verbal phrases that are quasi-synonymic to output slot alignment within patterns. That is, the corpus pattern paraphrasing system 100 parses the corpus of sentences 130 (Step 1), and then determines the most frequent nouns that co-occur with each verb in the sentences (Step 2). For the two input verbs find the intersection of the sets above (Step 3). Then, the corpus pattern paraphrasing system 100 finds the patterns that may use those words (i.e., the analyzing circuit 101) (Step 4). Using the following pseudo code for each two patterns:

Pc=Xc Vc Yc Zc, Pt=Xt Vt Yt Zt arg xc,yc,zc max p(Xc, Yc, Zc|Vc, Vt Xt, Vt, Zt)=p(Vc, Xc, Yc, Zc Vt, Xt, Yt, Zt)*const;

p(Vc, Xc, Yc, Zc,Vt Xt, Yt, Zt);
p(Vc|Vt, Xt, Yt, Zt);
p(Xc|Vt, Vc, Xt, Yt, Zt);
p(Yc|Vt, Vc,Xc, Xt, Yt, Zt); and
p(Zc|Vt, Vc, Xc, Yc, Xt, Yt, Zt), the conditional probabilities above for Vc, Xc, Yc etc. are computed prior from corpus by frequency counts (Step 5). The Xc, Yc . . . are complex words (i.e., "new words") and the probabilities are also computed over lexical features, not words. Based on the above highest probability that the aligning of the words has the same semantic meaning as paraphrased, the aligning circuit 103 outputs the aligned words in the slots with the highest probability to give the paraphrase pattern 160.

Figure 2:
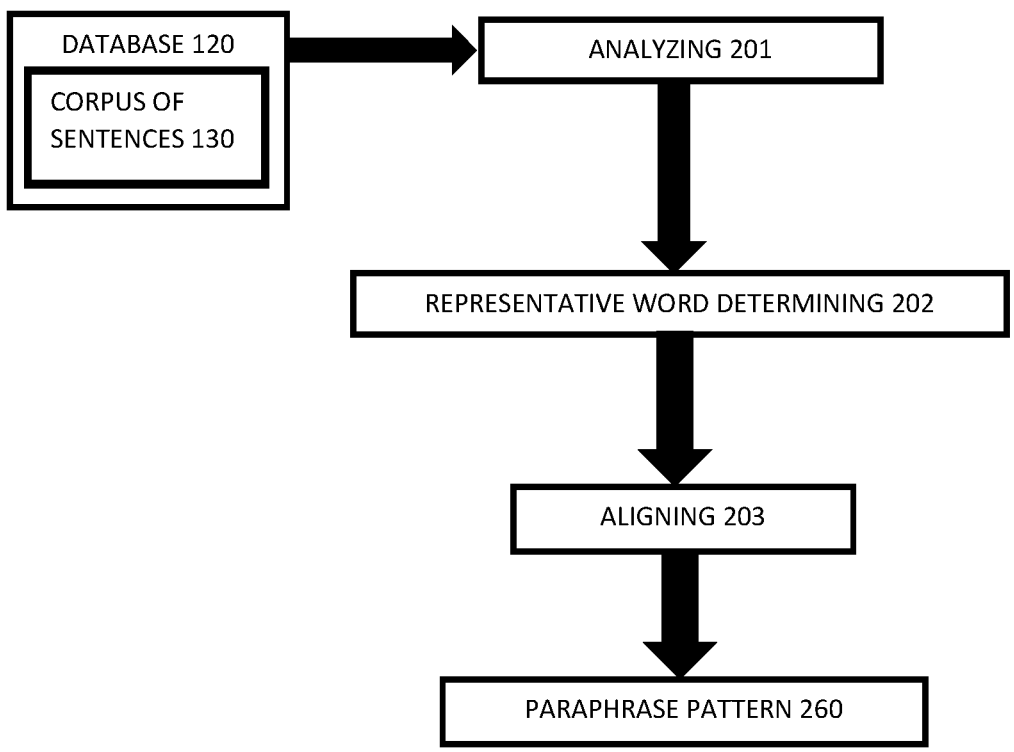
FIG. 2 exemplarily shows a high level flow chart for a corpus pattern paraphrasing method 200.

FIG. 2 shows a high level flow chart for a method 200 for corpus pattern paraphrasing.

Step 201 analyzes the corpus of sentences 130 stored in the database 120 to determine the regular structures expressed as patterns and apply deep learning of structure over the patterns.

Based on the classes of the pattern output by Step 201, Step 202 determines a plurality of words that can represent each class such that Step 203 can calculate a probability that the created paraphrase has a same semantic meaning using the representative words along with the interchangeable verbs.

Based on the substitute or synonym words determined by Step 201 and using the representative words found by Step 202, Step 203 aligns the classes of words with the substitute or synonym words according to their syntactic slots to give the same semantic meaning with the different words to paraphrase the identified sentence using the different set of substitute or synonym words.

The method 200 for corpus pattern paraphrasing can use the pseudo algorithm described above to determine the alignment of words to output the paraphrase patterns 260.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least live characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available, over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 lay be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or More circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FI. 8 are intended to be illustrative only and that computing nodes 10 and cloud computing environment 50 can communicate with any type of computerized circuit over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and Masks, as well as protection for data and other resources. User portal 83 provides access to the cloud computing environment for consumers and system administrators. Service level management 84 provides cloud computing resource allocation and management such that required service levels are net. Service Level Agreement (SEA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the corpus pattern paraphrasing system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A corpus pattern paraphrasing system comprising:
a processor; and
a memory, the memory storing instructions to cause the processor to perform:
aligning slots of patterns for verbal phrases based on syntactical and lexical features based on lattice algebra along with calculated synonyms that form a new word in the verbal phrases to predict paraphrases of the patterns that are not previously stored in a corpus of sentences in a database, the calculated synonyms being calculated using a semantic analysis according to a probability that the predicted paraphrases of the patterns have a same semantic meaning using representative words along with interchangeable verbs as the new word,
wherein the lexical features are identified with a relation to ambiguous words in the corpus of sentences to give meaning to the ambiguous words,
wherein the paraphrase of the patterns include exactly one semantic meaning and rules are created that are congruent to the semantic meaning, and
wherein the rules are syntactic-semantic rules that express linguistic knowledge on how the verbs expressed as patterns are used, and
wherein the aligning further aligns word slots of different occurrences of the paraphrase of the patterns of words replaced with substitute words and representative words in the paraphrase of the patterns and a second paraphrase pattern to give the same semantic meaning to the paraphrase of the patterns and the second paraphrase pattern as a sentence of the corpus of sentences.

2. The system of claim 1, wherein a plurality of regular rules are created based on the corpus of sentences, the plurality of regular rules being created independently to the database to predict a meaning of the corpus of sentences without referring to the database.

3. The system of claim 2, wherein a probability of the paraphrase pattern having the same semantic meaning is computed for each order of the classes of words replaced with the substitute words.

4. The system of claim 3, wherein the substitute words have a same syntactical meaning as the classes of words.

5. The system of claim 2, wherein the plurality of substitute words comprise a plurality of most frequently used words in the corpus of sentences that have a same lexical feature.

6. The system of claim 1, wherein the relation of the lexical features to the ambiguous words includes a part of speech.

7. The system of claim 1, wherein the rules being are created independently to the database to predict a syntactic meaning and a semantic meaning of the corpus of sentences without referring to the database.

8. The system of claim 1, wherein the rules being are created independently to the database to predict a syntactic meaning and a semantic meaning of the corpus of sentences without referring to the database.

9. The system of claim 8, wherein the syntactical feature of each word in the corpus of sentences is set as the syntactic meaning based on the lexical features of the sentences in the corpus of sentences and a generic placeholder is assigned for the syntactical feature such that the generic placeholder is replaced with a different word having the same syntactical feature.

10. The system of claim 1, wherein the syntactical feature of each word in the corpus of sentences is set as the syntactic meaning based on the lexical features of the sentences in the corpus of sentences and a generic placeholder is assigned for the syntactical feature such that the generic placeholder is replaced with a different word having the same syntactical feature.

11. The system of claim 1, wherein the syntactical feature of each word in the corpus of sentences is set as the syntactic meaning based on the lexical features of the sentences in the corpus of sentences and a generic placeholder is assigned for the syntactical feature such that the generic placeholder is replaced with a different word having the same syntactical feature.

12. The system of claim 1, wherein the verbal phrases are synonymic with a sentence of the corpus of sentences.

13. A corpus pattern paraphrasing method, comprising aligning slots of patterns for verbal phrases based on syntactical and lexical features based on lattice algebra along with calculated synonyms that form a new word in the verbal phrases to predict paraphrases of the patterns that are not previously stored in a corpus of sentences in a database, the calculated synonyms being calculated using a semantic analysis according to a probability that the predicted paraphrases of the patterns have a same semantic meaning using representative words along with interchangeable verbs as the new word,
- wherein the lexical features are identified with a relation to ambiguous words in the corpus of sentences to give meaning to the ambiguous words,
- wherein the paraphrase of the patterns include exactly one semantic meaning and rules are created that are congruent to the semantic meaning, and
- wherein the rules are syntactic-semantic rules that express linguistic knowledge on how the verbs expressed as patterns are used, and
- wherein the aligning further aligns word slots of different occurrences of the paraphrase of the patterns of words replaced with substitute words and representative words in the paraphrase of the patterns and a second paraphrase pattern to give the same semantic meaning to the paraphrase of the patterns and the second paraphrase pattern as a sentence of the corpus of sentences.

14. A non-transitory computer-readable recording medium recording a corpus pattern paraphrasing program, the program causing a computer to perform:
- aligning slots of patterns for verbal phrases based on syntactical and lexical features based on lattice algebra along with calculated synonyms that form a new word in the verbal phrases to predict paraphrases of the patterns that are not previously stored in a corpus of sentences in a database, the calculated synonyms being calculated using a semantic analysis according to a probability that the predicted paraphrases of the patterns have a same semantic meaning using representative words along with interchangeable verbs as the new word,
- wherein the lexical features are identified with a relation to ambiguous words in the corpus of sentences to give meaning to the ambiguous words,
- wherein the paraphrase of the patterns include exactly one semantic meaning and rules are created that are congruent to the semantic meaning,
- wherein the rules are syntactic-semantic rules that express linguistic knowledge on how the verbs expressed as patterns are used, and
- wherein the aligning further aligns word slots of different occurrences of the paraphrase of the patterns of words replaced with substitute words and representative words in the paraphrase of the patterns and a second paraphrase pattern to give the same semantic meaning to the paraphrase of the patterns and the second paraphrase pattern as a sentence of the corpus of sentences.

* * * * *